(12) United States Patent
Hofmann et al.

(10) Patent No.: US 11,565,714 B2
(45) Date of Patent: Jan. 31, 2023

(54) SYSTEM FOR ESTIMATING RIDING POSTURE

(71) Applicant: Honda Research Institute Europe GmbH, Offenbach/Main (DE)

(72) Inventors: Marius Hofmann, Darmstadt (DE); Herbert Janssen, Offenbach (DE); Hermann Winner, Bietigheim (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 132 days.

(21) Appl. No.: 17/206,161

(22) Filed: Mar. 19, 2021

(65) Prior Publication Data
US 2021/0291854 A1    Sep. 23, 2021

(30) Foreign Application Priority Data
Mar. 19, 2020   (EP) .................................... 20164241

(51) Int. Cl.
G06V 20/59   (2022.01)
B60W 50/16   (2020.01)
G06V 40/20   (2022.01)

(52) U.S. Cl.
CPC .......... *B60W 50/16* (2013.01); *G06V 20/597* (2022.01); *G06V 40/20* (2022.01)

(58) Field of Classification Search
CPC . B60W 50/0016; G06V 20/597; G06V 40/20; A61B 5/1116
See application file for complete search history.

(56) References Cited

U.S. PATENT DOCUMENTS

| | | | |
|---|---|---|---|
| 8,932,236 B1 * | 1/2015 | McKeon | A61B 5/103 600/595 |
| 11,213,140 B2 * | 1/2022 | Lee | A47C 31/126 |
| 11,345,298 B2 * | 5/2022 | Yoshizawa | B62D 1/04 |
| 11,390,130 B2 * | 7/2022 | Kabasawa | G01P 15/18 |
| 11,406,285 B2 * | 8/2022 | Ly | G16H 40/67 |
| 2021/0106256 A1 * | 4/2021 | Kogure | A61B 5/1118 |
| 2022/0058529 A1 * | 2/2022 | Dibia | A61B 5/681 |
| 2022/0073092 A1 * | 3/2022 | Yuasa | G08G 1/096775 |

OTHER PUBLICATIONS

Paola Forte, "Identification of the hand-arm system mechanical impedance by simultaneous measurement of grip, transmitted force and acceleration with an adaptable instrumented handle," Cogent Engineering, vol. 4, Feb. 2017, pp. 1-14.
Xueyan S. Xu et al., "Vibrations transmitted from human hands to upper arm, shoulder, back, neck, and head," International Journal of Industrial Ergonomics, vol. 62, Jul. 2016, pp. 1-13.

* cited by examiner

*Primary Examiner* — Albert K Wong
(74) *Attorney, Agent, or Firm* — JCIPRNET

(57) ABSTRACT

The present invention relates to a system for determining a posture of an operator of a device that transmits vibrations to the operator, wherein the system comprises at least one vibration sensor for measuring vibrations at at least one location on the body of the operator and/or the device, and a posture determining means for detecting one or more characteristics of the measured vibrations assigned to a predetermined posture and for determining the predetermined posture as the posture of the operator when the characteristic is detected.

16 Claims, 10 Drawing Sheets

SYSTEM FOR ESTIMATING RIDING POSTURE

CROSS-REFERENCE TO RELATED APPLICATION

This application claims the priority benefit of European application serial no. 20164241.0, filed on Mar. 19, 2020. The entirety of the above-mentioned patent application is hereby incorporated by reference herein and made a part of this specification.

TECHNICAL FIELD

The invention relates to a system and method for determining a posture of an operator of a device that transmits vibration to its operator, in particular of a driver or passenger of a vehicle. More specifically, the invention relates to a system and method for determining a posture of a rider riding a two-wheeled or three-wheeled vehicle.

BACKGROUND

Over the last years driver assistance systems have been developed in order to increase the comfort for a driver and the safety of driving. Such driver assistance systems are capable of sensing not only the environment around a vehicle, but also monitoring the driver or passenger to determine its presence, gaze direction, awareness and/or posture. In order to do so, the vehicles are equipped with cameras capturing images of the driver and/or the passengers. The captured images are processed to derive information on presence and/or posture.

Such cameras are often difficult to integrate, especially in motorcycles like two-wheelers, three-wheelers or quad bikes without a cabin. Further, the quality of the captured image may be affected by weather conditions, for example, by raindrops or dirt on the lens. However, similar to cars, the posture of a rider is essential to the safety of the rider and vehicle operation. An estimated posture can be used to set vehicle stability control parameters, to trigger automatic emergency braking, to select a driving mode (sport, low-torque or rain), to adapt damper setting and/or to give feedback for rider about unsafe rider posture.

On the other hand, monitoring the operation of tools and work machines by an operator can increase safety, too. However, it is difficult to capture images of a worker using such a machine or tool because many machines do not offer a position that allows proper imaging of the worker, which would be needed to determine the worker's posture in order to switch off the working machine in case of its unsecure handling.

It is desired to overcome the above-mentioned drawbacks and to provide an improved system for determining a posture of an operator of a device, for example, the driver, or a passenger of a vehicle. More specifically, it is an object of the invention to provide a system and method, with which the posture of a rider riding a vehicle can be estimated with low effort and costs.

SUMMARY

This is achieved by a system and a method determining a posture of an operator of a device that transmits vibrations to the operator.

According to the present invention, a system for determining a posture of an operator of a device, particularly a rider riding a vehicle, that transmits vibrations to the operator comprises at least one vibration sensor for measuring vibrations at at least one location on the body of the operator and/or the device and a posture determining means for detecting one or more characteristics of the measured vibrations assigned to a predetermined posture and for determining the predetermined posture as the posture of the operator when the characteristic is detected.

According to the present invention, a method for determining a posture of an operator operating a device that transmits vibrations to its operator, comprises the steps of: measuring vibrations at at least one location on the body of the operator and/or the device, detecting one or more characteristic(s) of the measured vibrations assigned to a predetermined posture, and determining the predetermined posture as the posture of the operator when the characteristic is detected.

BRIEF DESCRIPTION OF THE DRAWINGS

The invention is to be explained more detailed in the following with reference to the accompanying drawing.

DETAILED DESCRIPTION

Figure 1:
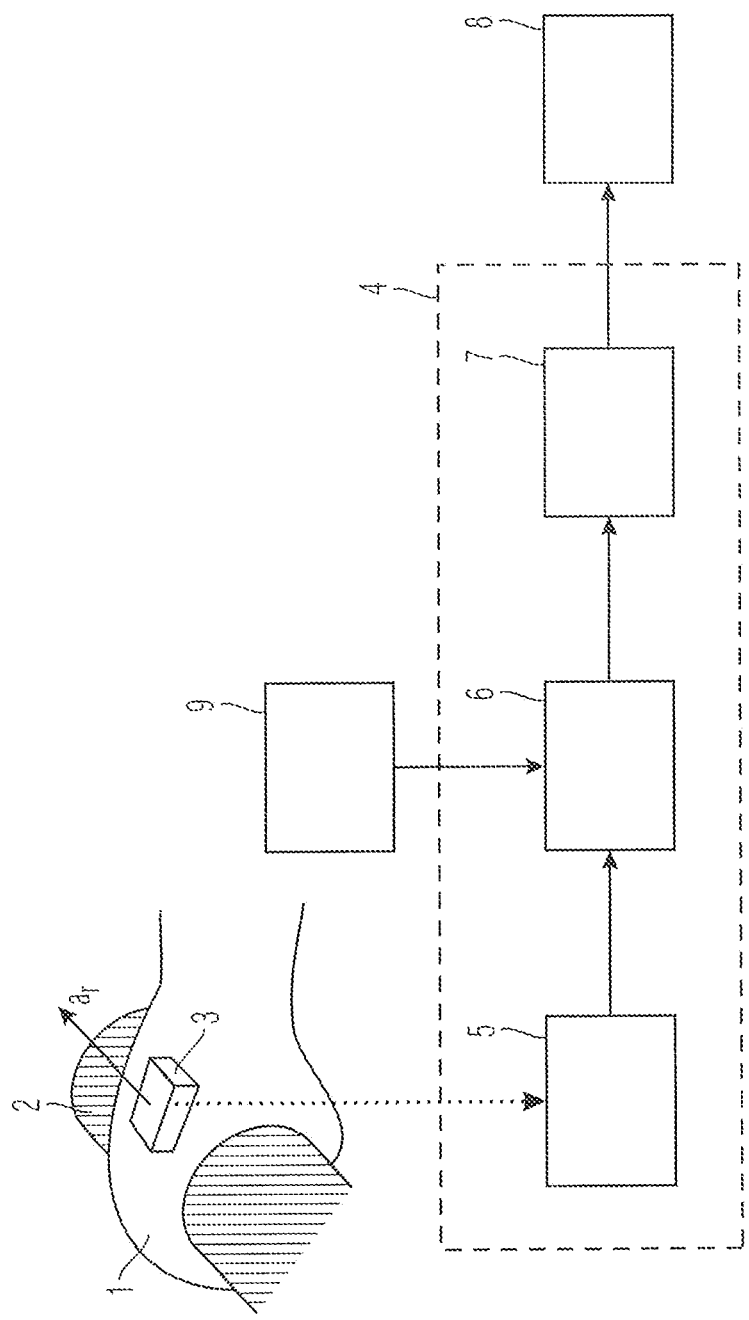
FIG. 1 shows a schematic structural diagram of a system according to a first embodiment of the present invention.

In many devices, mechanical vibrations generated by external and/or internal sources of the device are transmitted from the device to the operator. The application takes into account the fact that the vibration transmissibility within the device, from the device to the human body and within the human body as well as the vibration characteristic (frequencies and amplitudes) at a location on the vehicle or the human body depends on the posture of the human body being in contact with the device or its vibrating parts.

The term "posture" means the totality of body posture, especially with regard to a "riding posture" or "rider posture", handle grip force, muscle tension, vehicle-rider contact, e.g., hands-on-handlebar vs hands-off-handlebar, strength of handlebar grip, strength of knee-vehicle contact, feet-on-footrests/pegs vs feet-off-footrests/pegs, arm angle, leg angles, a upright posture, forward-leaning posture and/or standing posture are included.

The device may be any work machine or tool and can be any vehicle, which transmits mechanical vibrations generated by external and/or internal sources of the vehicle to the operator(s) and where the posture is essential to the safety of the operator, driver or rider and/or device operation. Preferably, the device can be a vehicle such as a bicycle, scooter, motorcycle like two-wheelers, three-wheelers or quad bikes, either powered or unpowered.

The posture estimated by the system can be stored for analysis and statistical purposes and/or can be further processed by the system to generate an acoustical and/or visually warning signal for the operator(s), and/or, in case the operator is a vehicle driver or rider, can be supplied to a separate driver assistance system. Alternatively, the system can be a part of the driver assistance system.

The characteristics of vibrations assigned to the predetermined posture can be estimated and stored by the manufacturer or the operator (rider), wherein characteristics of vibrations are analyzed during the operator operates the device with the posture to be estimated.

The vibration sensor(s) can be configured to measure translational and/or rotational movement and/or can comprise at least one of an accelerometer, a piezoelectric sensor, a piezo-resistive sensor, resistive sensor, an inductive sensor, a capacitive sensor, a gyroscope, a magnetometer and a seismometer.

Alternatively or in addition, the vibration sensor(s) can be configured to measure the vibrations at at least one of the locations: palm, back of the hand, wrist, forearm, upper arm, shoulder, sole, ankle, lower leg, knee, thigh of the operator. In case that the operator is a driver or rider of a vehicle, the vibration may also be measured at at least one of the following locations: steering wheel, handlebar, handlebar grips, footrest, seat, frame, fork bridge, engine mount and engine of the vehicle.

Preferably, at least one of the characteristics can be an intensity of the measured vibrations. With the measured intensity, for example, the postures "hands-on-handlebar" and "hands-off-handlebar" or the postures "feet-on-footrest" and "feet-off-footrest" can be determined easily, wherein the vibration intensity at a location on the handlebar or the footrest increases when the hand or the feet is removed from handlebar or the footrest, whereas the vibration intensity at a location on the hand or foot decreases. Further, a very high vibration intensity at a location on the foot indicates a standing position/posture of the rider.

The measured vibrations also depend on the excitation source of the vibrations. Even if the wheels and/or an engine of the device is the excitation source, its emitted vibrations are often not constant and depend on the device and/or engine speed. This can be taken into consideration in order to increase the detection accuracy. For example, the posture determining means can be configured to determine an excitation frequency of the vibrations and/or the excitation intensity and to perform a filtering by a band-pass filter that passes frequencies of the measured vibrations within a certain range, wherein the center frequency of the band-pass filter is the determined excitation frequency and/or to perform an amplification or damping of the measured vibrations based on the determined excitation intensity.

Alternatively or in addition, at least one of the characteristics can be a composition of frequencies and amplitudes in a frequency spectrum of the measured vibrations, wherein the posture determining means is configured to transform a signal of the measured vibrations in the frequency domain and to detect, in the frequency spectrum of the transformed signal, the composition of frequencies and amplitudes assigned to the predetermined posture.

In addition, the posture determining means can be configured to detect one of the characteristics described above by measuring the vibrations at only one location.

Vibrations at the excitation source could be determined indirectly and, when the vibrations are transferred from a first location to a second location, the vibration sensor(s) can be configured to merely measure vibrations at the second location.

Preferably, the posture determining means can be configured to determine vibrations of the first location based on at least one of: an engine speed of the vehicle, driving speed of the vehicle, gear position and throttle position.

Alternatively, the vibration sensor(s) can be configured to measure vibrations of the first location on the vehicle and to measure vibrations of the second location on the vehicle or the body of the rider.

Alternatively or in addition, the vibration sensor(s) can be configured to measure both vibrations of the first location and vibrations of the second location on the body of the operator.

At least one of the characteristics can be a transfer function of vibrations transferred from the first location to the second location, wherein the posture determining means is configured to calculate the transfer function and to compare the calculated transfer function with a transfer function assigned to the predetermined posture.

Alternatively or in addition, at least one of the characteristics can be a coherence between vibrations of the first location and the second location, the posture determining means is configured to calculate magnitude squared coherence between vibrations of the first location and the second location and to compare the calculated magnitude squared coherence with a magnitude squared coherence assigned to the predetermined posture.

Preferably, the posture determining means is configured to determine each of a plurality of different postures of the operator, wherein each posture is classified by one or more predetermined characteristics and/or a predetermined combination of characteristics.

The same features are denoted in the figures by the same reference signs. It is to be noted that for the following explanations it is assumed that the device is a two-wheeled vehicles such as a motorcycle and the operator is the writer of the motorcycle, unless indicated otherwise.

FIG. 1 shows a system for determining postures of a rider riding a vehicle according to a first embodiment of the present invention. To be more precise, the vehicle is a motorcycle (not shown) and the determined postures are "right hand 1 on a handlebar 2" of the motorcycle and "right hand 1 off the handlebar 2". The system comprises a vibration sensor 3 for measuring vibrations at the right hand 1 and a posture determining means 4 for determining whether the right hand 1 is placed on the handlebar 2 as shown in FIG. 1 or the right hand 1 is removed from the handlebar 2.

The sensor 3, which can be an inertial measurement unit (IMU), is located in a glove of the rider, measures translational and/or rotational movement at the right hand 1 and transmits the measurement result to the posture determining means 4, preferably via a wireless connection (e.g. Bluetooth). The posture determining means 4 comprises a receiving unit 5 for receiving the measurement result (measured vibrations) from vibration sensor 3, a detecting unit 6 for detecting/extracting characteristics of the measured vibrations, with which "hand-on-handlebar" posture or "hand-off-handlebar" posture can be determined and a determining unit 7 for determining the "hand-on-handlebar" posture or "hand-off-handlebar" posture based on the extracted characteristics and for transmitting, by wireless link or cable, a signal to a warning light 8 when the "hand-off-handlebar" posture is detected. The posture determining means 4 may be realized as a processor configured to perform the necessary calculations based on an input signal from the vibration sensor 3. The signal generated by the vibration sensor 3 may be preprocessed before it is input into the processor.

With the "hand-on-handlebar" posture, vibrations generated by the combustion engine of the motorcycle are transmitted from the engine to the right hand 1 via the handlebar 2, whereas there is no transfer of vibrations via the handlebar 2 with the "hand-off-handlebar" posture.

In this way, an amplitude of the vibrations indicates the "hand-off-handlebar" posture and the "hand-on-handlebar" posture. In order to tune the detecting unit 6 to the vibrations generated by the engine, information on engine speed is supplied from an electronic control unit 9 (ECU) of the motorcycle and the detecting unit 6 determines the amplitude at a frequency that corresponds to the current engine speed by filtering the measured vibrations or by transforming the signal of the measured vibrations in the frequency domain.

Figure 2:
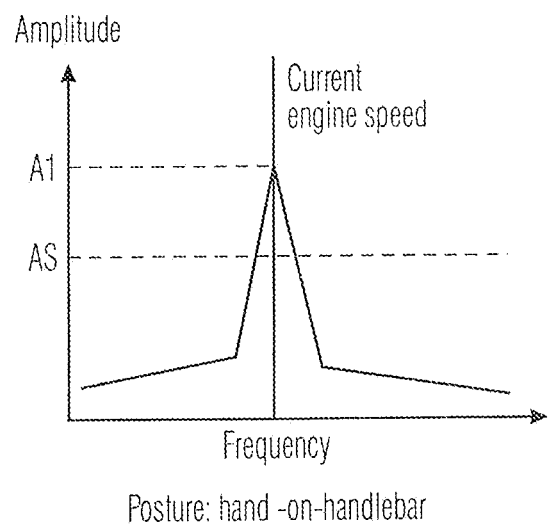
FIG. 2 shows characteristic of vibrations measured by the system shown in FIG. 1 and assigned to a first posture.
Figure 3:
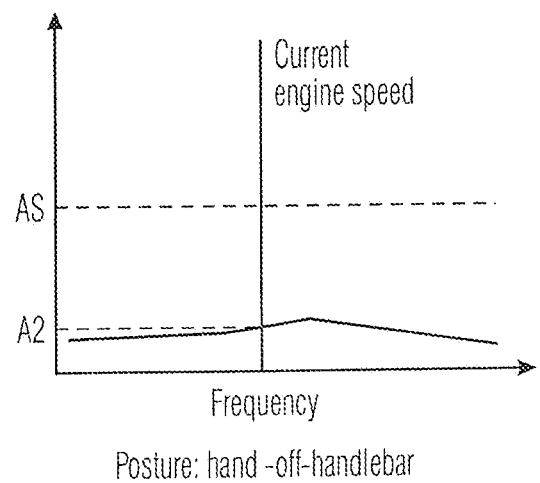
FIG. 3 shows characteristic of vibrations measured by the system shown in FIG. 1 and assigned to a second posture.

FIG. 2 shows a diagram of the measured amplitude of "hand-on-handlebar" posture in the frequency domain (vibration spectrum) and FIG. 3 shows a diagram of the measured amplitude of "hand-off-handlebar" posture, wherein the amplitudes A1 and A2 are measured at the same frequency of the engine speed. As shown in FIG. 2 and FIG. 3, the amplitude A1 of "hand-on-handlebar" posture exceeds a threshold AS and the amplitude A2 of "hand-off-handlebar" posture is below the threshold AS.

The detecting unit 6 detects the amplitude A1, A2 at the frequency of the excitation source (engine) and the determining unit 7 compares the detected amplitude A1, A2 and the threshold AS and transmits the signal to the warning light 8 when the amplitude A1, A2 is below the threshold AS. The threshold AS is set by the manufacturer or the user (rider) based on tests.

Since the detected amplitude A1, A2 also depends on the engine speed, the threshold AS can be set/adjusted dependent on the engine speed, wherein, for example, the threshold AS is increased when the engine speed approaches a critical engine speed and vice versa. With the system described above, "right-hand-on/off-handlebar" posture is determined only. However, "left-hand-on/off-handlebar" posture and/or "feet-on/off-footrests" can be determined similarly. Alternatively or in addition, the vibration sensor 3 can measure the vibrations at the handlebar 2 and/or the footrest, wherein the determining unit 7 transmits the signal to the warning light 8 when the amplitude A1, A2 exceeds the threshold AS.

As described above, a band-pass filter, which only passes frequencies close to a known excitation frequency (e.g. of the engine), can be applied to the sensor's output. Further, the filter bandwidth can be continuously adapted to match the excitation frequency. Whether and how strong the vibrations are measureable at the sensor position depends on the excitation source, the rider-vehicle contact surfaces and the general posture of the rider. The output of the filter is compared with estimated values for certain rider postures for the current estimated excitations.

Alternatively or in addition, a spectral analysis (Fourier Transformation) can be performed by the detecting unit 6 for a certain time window, wherein the output shows the composition of frequencies and amplitudes of the signal during the given time window. Since applying a rectangular window creates artifacts, a fitting window function can improve the quality (e.g. Hamming window). The determining unit 7 compares the output of the detecting unit 6 with the expected output for different rider postures at the current excitation level to estimate the posture.

Motorcycle and rider form a mechanical system that transmits the vibrations. A system, with which shift of the overall transmissibility from handlebar (or similar objects) to the human body with respect to the posture can be determined, is disclosed in Forte, Paola; Pham, Duc (2017): "Identification of the hand-arm system mechanical impedance by simultaneous measurement of grip, transmitted force and acceleration with an adaptable instrumented handle", Cogent Engineering 4 (1), S. 2953. Further, Xu, Xueyan S.; Dong, Ren G.; Welcome, Daniel E.; Warren, Christopher; McDowell, Thomas W.; Wu, John Z. (2017): "Vibrations transmitted from human hands to upper arm, shoulder, back, neck, and head", International journal of industrial ergonomics 62, S. 1-12, discloses a system, with which the transmissibility of vibrations from an excitation source held in one or both hands to other parts of the body can be determined.

Figure 4:
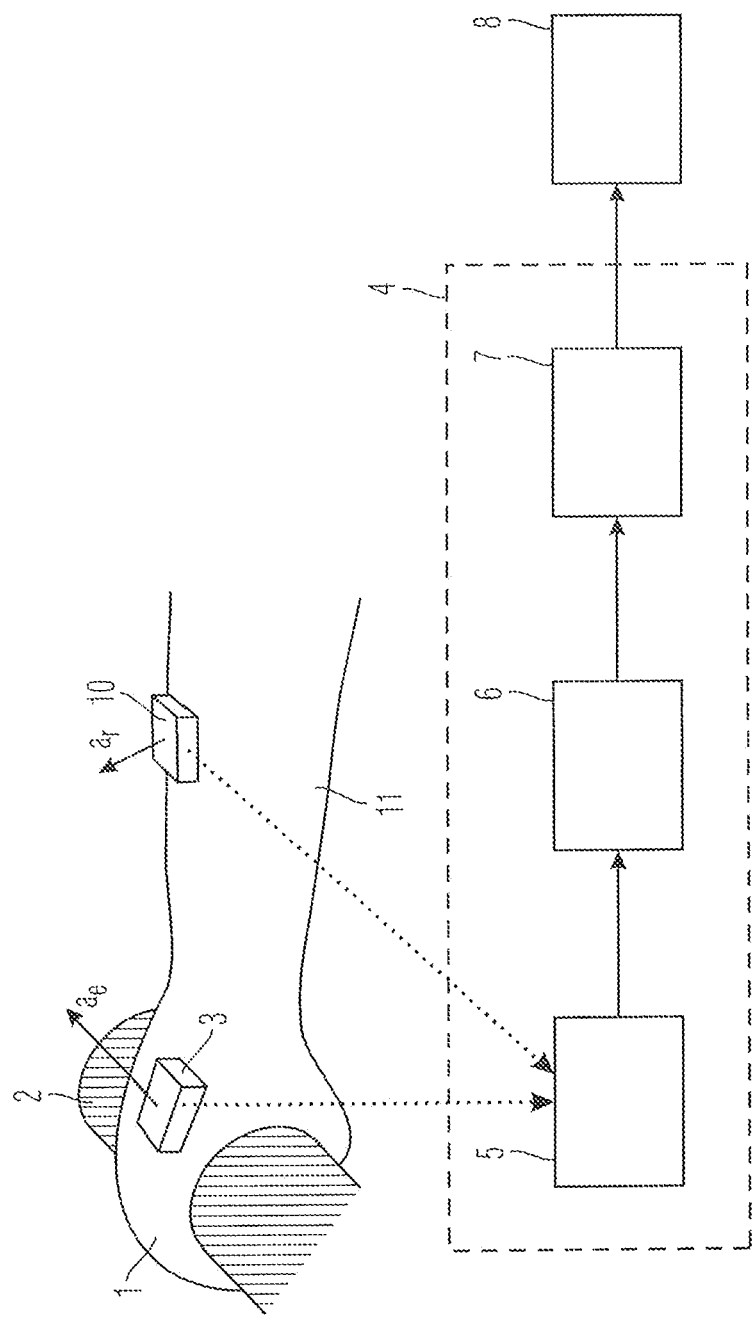
FIG. 4 shows a system according to a second embodiment of the present invention.

According to the present invention, the posture can be determined based on transfer function of the vibrations measured at different locations. FIG. 4 shows a system according to a second embodiment of the present invention, in which the vibration sensor 3 measures the vibrations at the right hand 1 and sensor 10 measures the vibrations at the right forearm 11. Both vibration sensors 3 and 10 transmit the measurement results to the receiving unit 5. The detecting unit 6 estimates the transmissibility of vibrations from the right hand 1 to the right forearm 11 and generates/calculates a respective transfer function. With the transfer function, in addition to the "right-hand-on/off-handlebar" posture, the hand-arm posture can be determined.

The transfer function H(s) describes the relation between a given input ae(t) and a resulting output ar(t) in the Laplace domain, wherein ae(t) corresponds to the measured vibrations at the right hand and ar(t) corresponds to the vibrations at the right forearm 11.

$$H(s) = \frac{\mathcal{L}(a_r(t))}{\mathcal{L}(a_e(t))} = \frac{Y(s)}{X(s)}$$

The transfer function H(s) of a mechanical system consisting of springs and dampers depends on the spring and damping constants. As a tensing or relaxing of muscles also changes the mechanical properties of the human body (e.g. damping behavior), it also changes the transfer function. From these changes, the current posture of the rider can be estimated by comparing each generated transfer function with transfer functions for known hand-arm postures. In this way, the posture is estimated with the transfer function as classifier. For known hand arm postures the associated transfer functions, in a memory connected with the determining unit 7.

The determining unit 7 compares the estimated transfer function and stored transfer functions for unsafe (hand-arm) postures and transmits the signal to the warning light 8 when the estimated transfer function is classified as unsafe.

Figure 5:
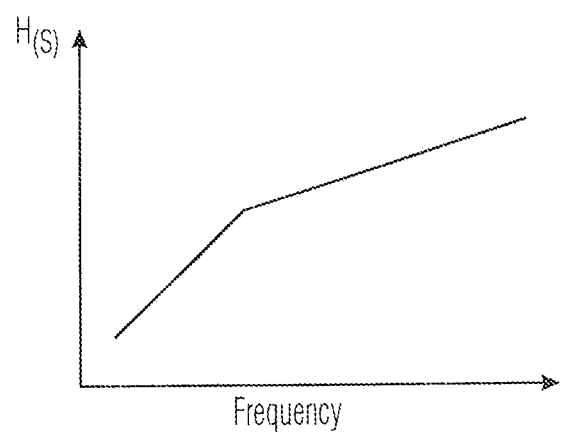
FIG. 5 shows characteristic of vibrations measured by the system shown in FIG. 4 and assigned to a third posture.
Figure 6:
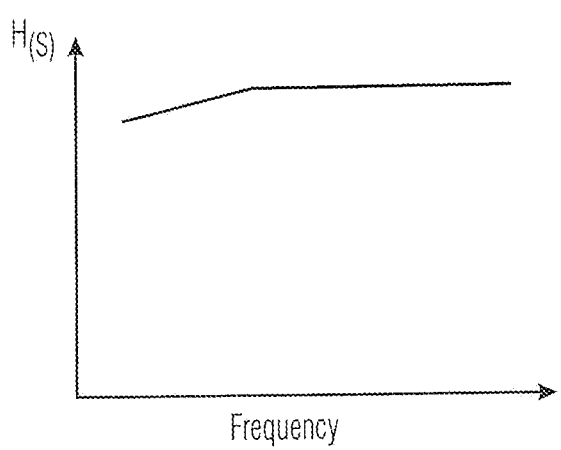
FIG. 6 shows characteristic of vibrations measured by the system shown in FIG. 4 and assigned to a fourth posture.

FIG. 5 and FIG. 6 show different transfer functions estimated over a short time window. The transfer function H(s) shown in FIG. 5 corresponds to the save posture "tense arm with strong grip" and the transfer function H(s) shown in FIG. 6 corresponds to the unsafe posture "lose arm with loose grip".

Alternatively or in addition, the transfer function H(s) between a part of the vehicle and a limb of the rider can be estimated, wherein the vibration sensor 3 measures the vibrations at a location on the motorcycle (e.g. engine, handlebar or footrest) and the vibration sensor 10 measures the vibrations at a location on the body of the rider (e.g. hand, arm or foot). In this way, the vibration sensor 3 is closer to the excitation source and the transfer function H(s) consists of the mechanical system of the motorcycle and the human body.

$$H(s) = \frac{\mathcal{L}(a_r(t))}{\mathcal{L}(a_e(t))} = H_{tw}(s) \cdot H_h(s)$$

A change in the rider posture again leads to change in the transfer function H(s). In the formula, Htw(s) is the component of the transfer function of the vehicle and Hh(s) is the component of the transfer function related to the human body. In some applications it might be beneficial to measure Htw(s) without the rider to calculate Hh(s)=H(s)/Htw(s) assuming a linear system behavior. Htw(s) can also be taken from a measured characteristic diagram. In this case, the influence of the rider's body is disregarded to calibrate the online measurement of rider-posture dependent on, e.g., engine speed.

Alternatively or in addition, the transfer function H(s) between two parts of the vehicle can be estimated, wherein sensor 3 measures the vibrations at a first location on the motorcycle (e.g. engine) and vibration sensor 10 measures the vibrations at a second location on the motorcycle (e.g. handlebar or footrest). In this way, the transfer function H(s) consists of the mechanical system of the motorcycle, which is affected by the human body:

$$H(s) = \frac{\mathcal{L}(a_r(t))}{\mathcal{L}(a_e(t))} = H_{tw}(s) \cdot H_h(s)$$

A change in the rider posture (e.g. damping of hands on handlebars) leads to changes in Htw(s). Thus, the rider posture can be concluded.

Alternatively or in addition, transfer function H(s) between a part of the vehicle and a limb of the rider can be estimated, wherein the vibrations at a first location on the motorcycle (e.g. engine) are estimated based on the engine speed and/or other parameter supplied by ECU and merely the vibrations at a second location on the body of the rider (e.g. handlebar or footrest) are measured by the vibration sensors 3 or 10.

Alternatively or in addition, the magnitude squared coherence Caear between the vibrations ae at a first location and the vibrations ar at a second location can be calculated and the calculated coherence Caear can be calculated with coherences for known hand-arm postures. The magnitude squared coherence Caear defined as $$C_{a_e a_r}(f) = \frac{|P_{a_e a_r}(f)|^2}{P_{a_e a_e}(f) \cdot P_{a_r a_r}(f)}$$

with $P_{a_e a_e}$ and $P_{a_r a_r}$ being the power spectral densities of input and output signal and $P_{a_e a_r}$ being the cross spectral density. For linear system functions and ergodic signals it can be used to estimate the correlation (causality) between the input signal ae and the output signal ar. It takes values between zero and one. For $C_{a_e a_r}(f)=1$ the output signal $a_r$ can be calculated if the signal $a_e$ and the transfer function are known. Only noise, non-linear system behavior or if the output is influenced by other inputs besides $a_e(t)$ will lower $C_{a_e a_r}(f)$. For a known level of noise, a change in the coherence can indicate a change of the rider posture.

The magnitude squared coherence Caear between two parts of the motorcycle, between a part of the motorcycle and a limb of the rider, or between two limbs of the rider is calculated.

Figure 7:
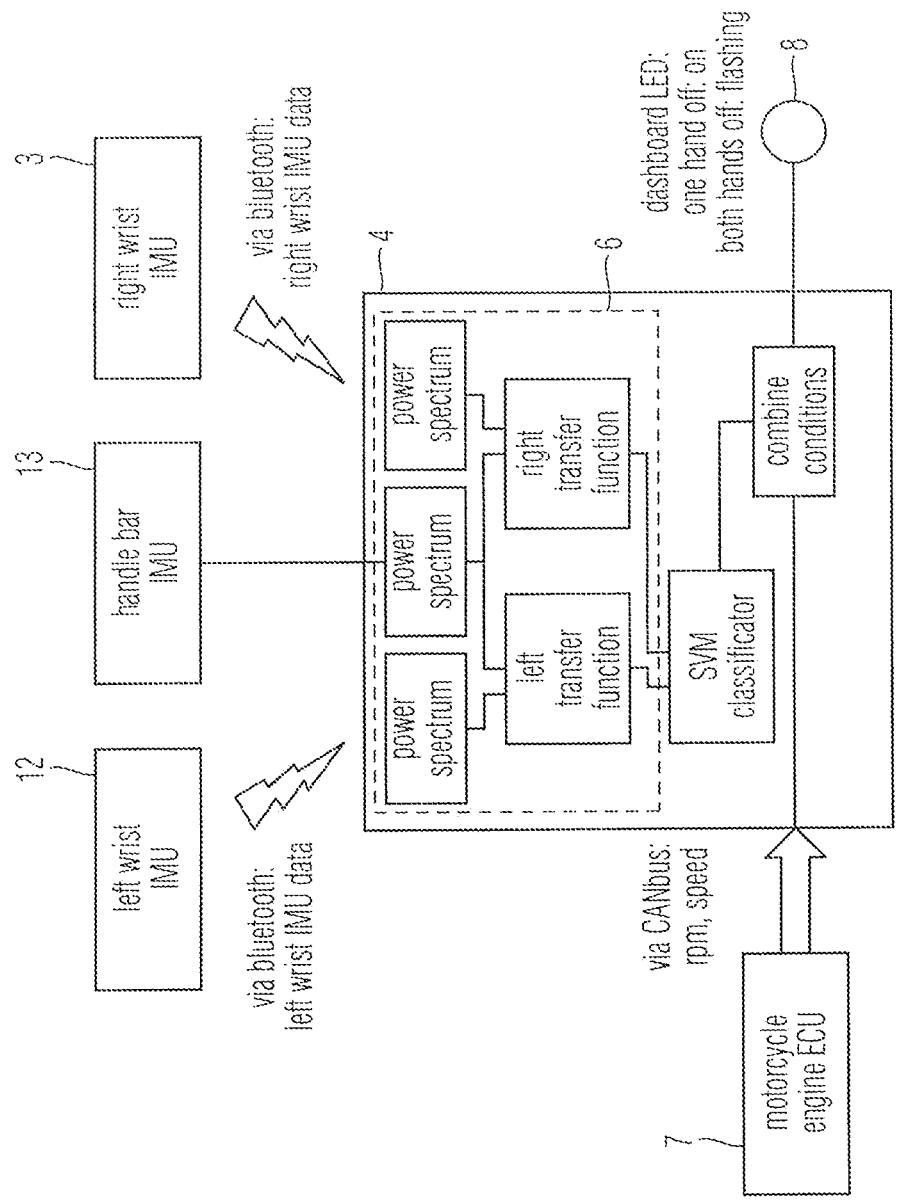
FIG. 7 shows a system according to a third embodiment of the present invention.

FIG. 7 shows a system according to a third embodiment of the present invention, the vibrational sensor 3 measures the vibrations at the right hand 1, vibration sensor 12 measures the vibrations at the left hand and vibration sensor 13 measures the vibrations at the handle bar. 2 The vibration sensors 3 and 12 transmit the measurement results (vibration signals) to the receiving unit 5 (not shown) and the vibration sensor 13 transmit the measurement results (vibration signals) to the detecting unit 6 via cable directly. The detecting unit 6 determines the power spectrum of each of the vibration signals and calculates a left transfer function for the left hand and a right transfer function for the right hand 1.

The determining unit 7 determines/classifies the rider posture "hand-on/off-handlebar" posture for the left and right hand based on the left transfer function and the right transfer function, respectively. Additionally the determining unit 7 receives engine speed (rpm) and/or speed indication information from the motorcycle ECU 7 via e.g. CAN-Bus to determine whether the motorcycle is actually in movement. The warning light 8 is a dashboard LED and the determining unit 7 unit will warn the rider whenever the motorcycle is driving and at least one hand is not on the handlebar 2 (condition A). Additionally, taking one hand off the handlebar 2 for a longer time (30s) or taking both hands off simultaneously will result in the dashboard LED to flash (condition B). The automatic emergency braking system of the motorcycle will be disabled unless both hands are on the handlebar, i.e. not condition A or B.

The system shown in FIG. 7 uses three IMU based vibration sensors 12, 13, 3: one attached to the handle bar 2 and two inside the motorcycle jacket's lower sleeves, close to each wrist. All IMUs 12, 13, 3 send their measurements to a small computing unit (the posture determining means 4) attached to the motorcycle where computations are performed.

Alternatively, all sensors and/or the computing unit (processor) can be attached to the rider or its clothing, wherein the warning light 8 can be mounted in the helmet (viewing area).

Figure 8:
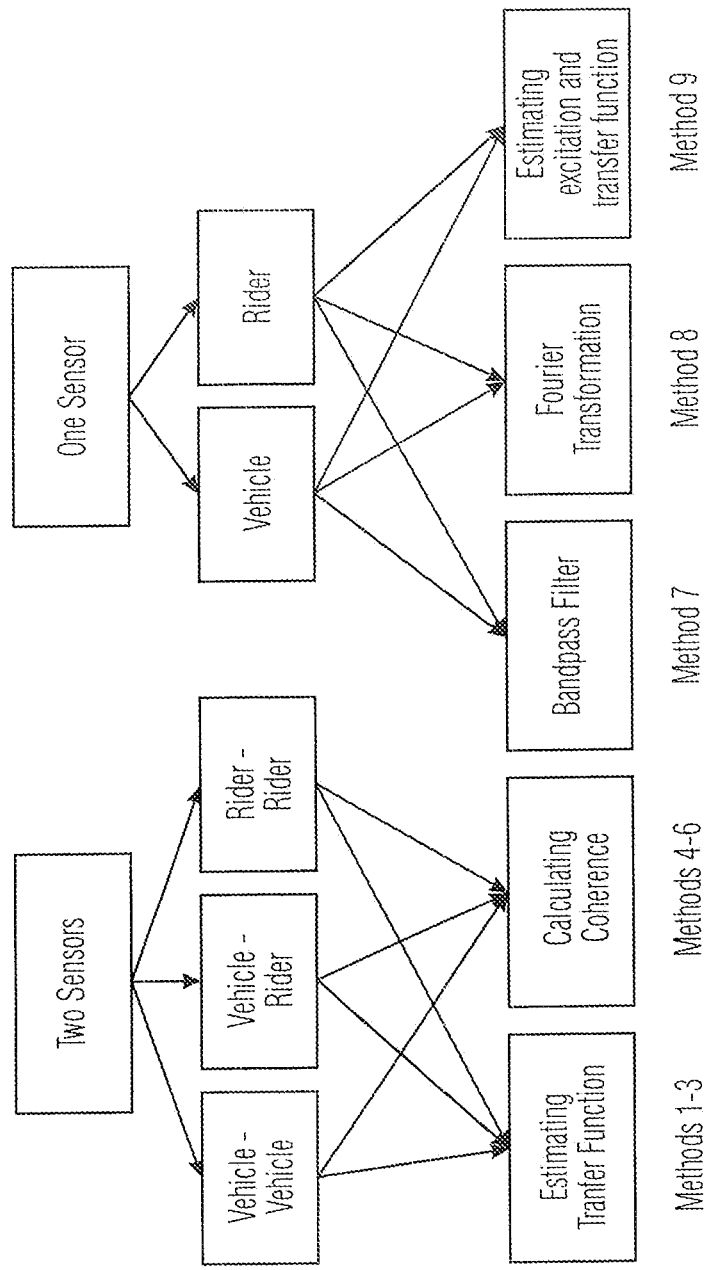
FIG. 8 shows an overview of dual-sensor and single-sensor methods, with which the posture can be determined.
Figure 9:
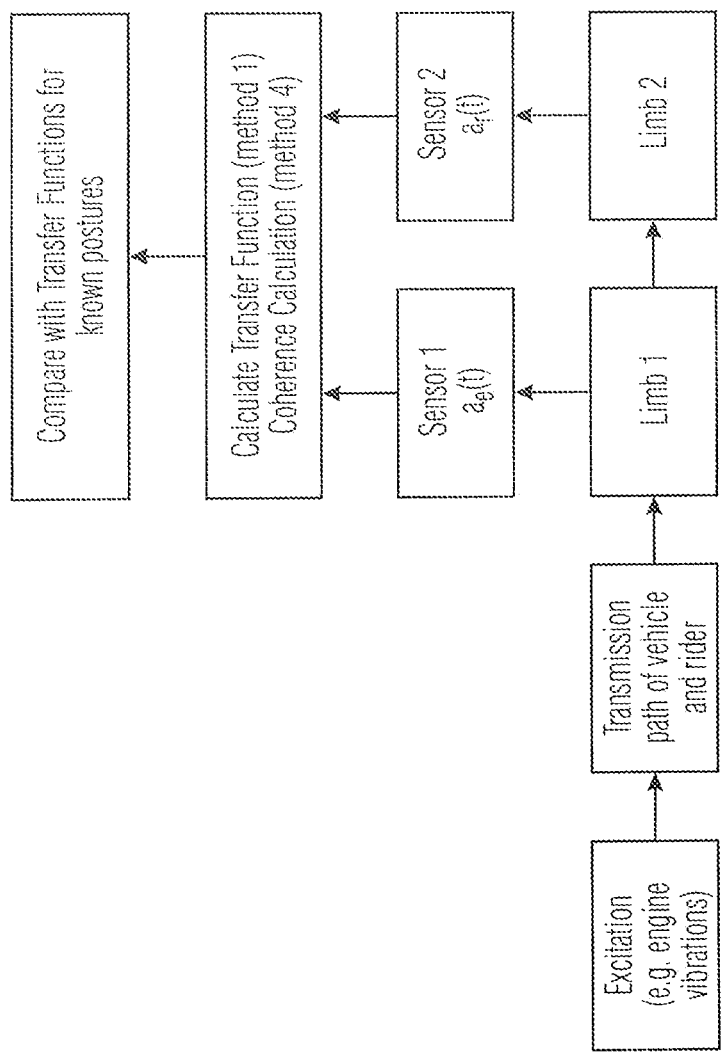
FIG. 9 to FIG. 11 show the steps of the dual-sensor methods.
Figure 10:
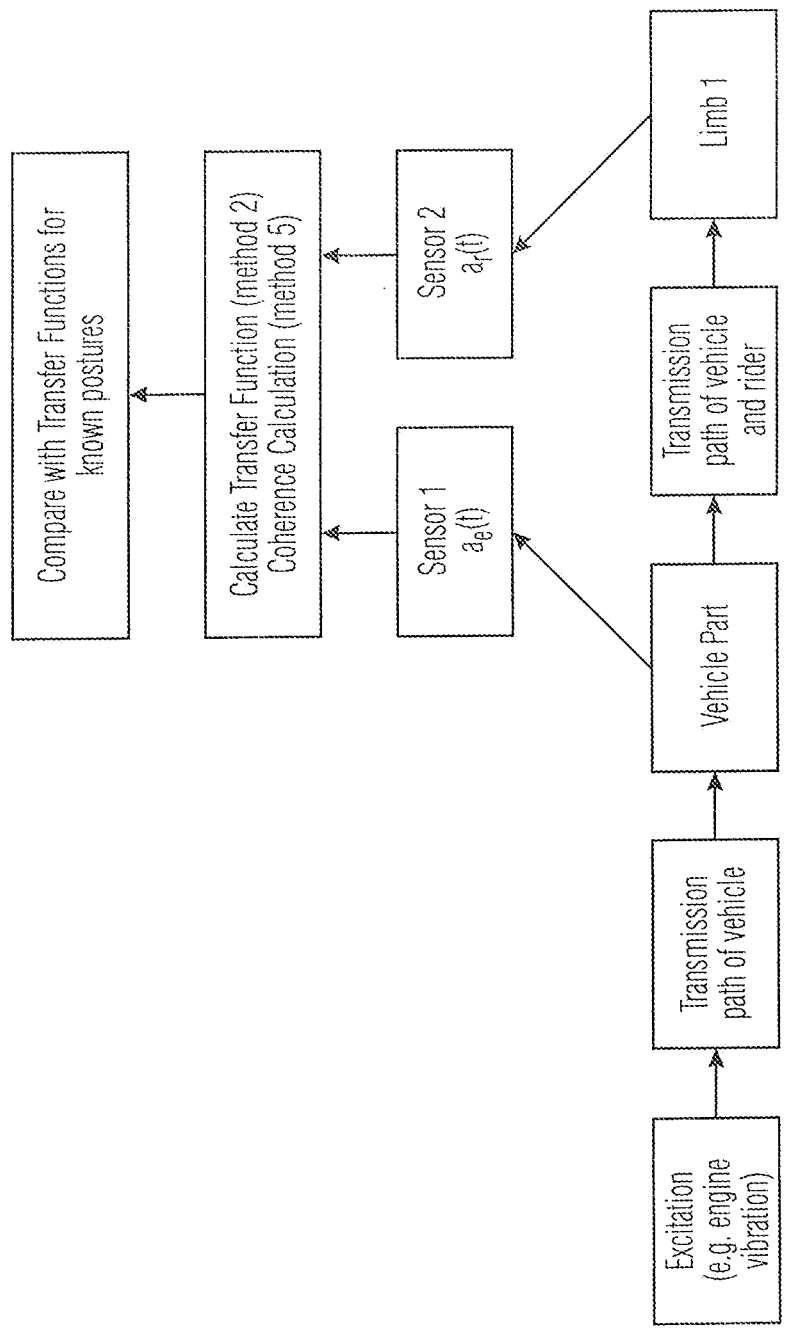
Figure 11:
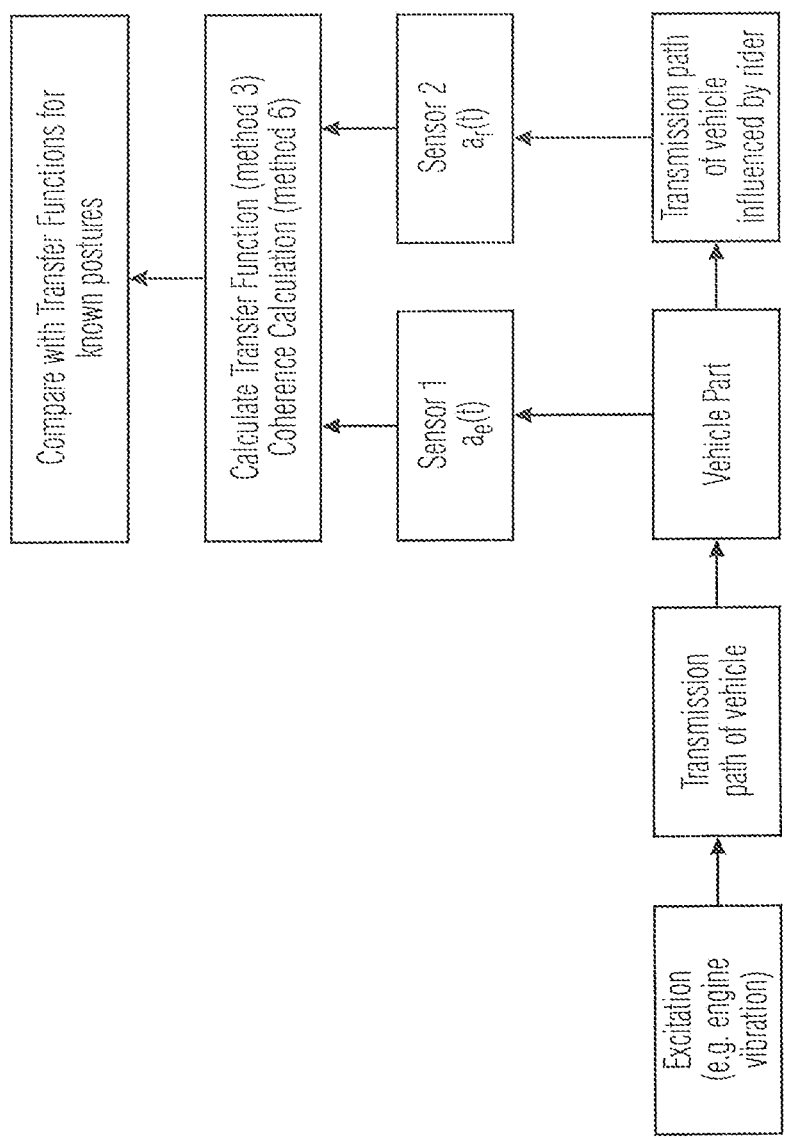
Figure 12:
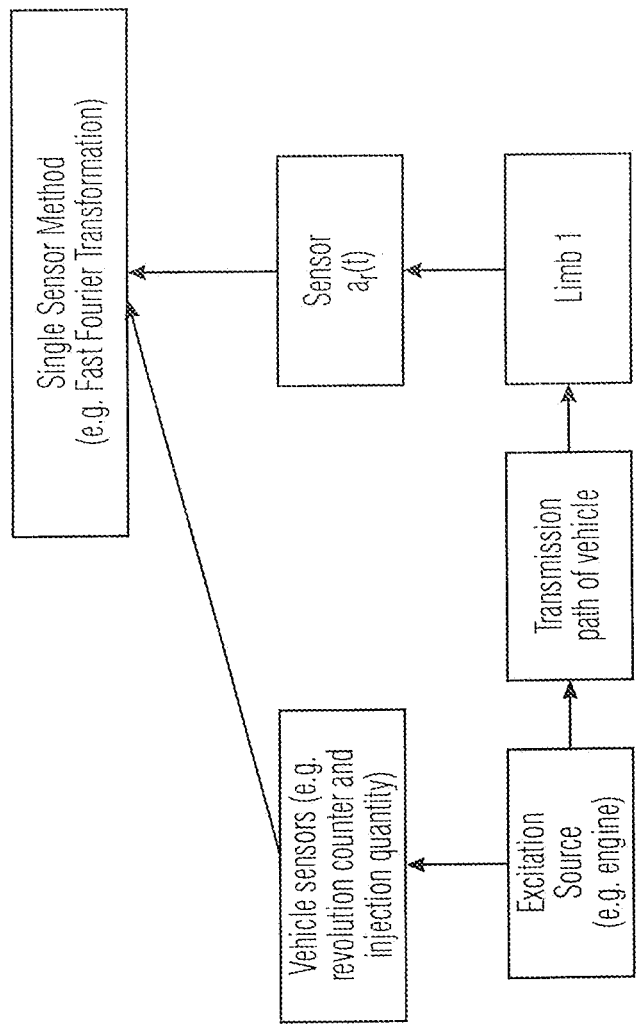
FIG. 12 shows the steps of the single-sensor methods.

FIG. 8 shows an overview of dual-sensor and single-sensor methods, with which the posture can be determined, FIG. 9 to FIG. 11 show the steps of the dual-sensor and single-sensor methods and FIG. 12 show the steps of the single-sensor methods.

With the present invention, the posture can be determined by the following dual-sensor methods:
   Method 1: The transfer function between the two limbs of the rider is estimated to estimate e.g. posture stiffness aka body tension (see FIG. 9).
   Method 2: The transfer function between a part of the vehicle and a limb of the rider is estimated, e.g. handle bar grip strength. (see FIG. 10)
   Method 3: The transfer function between two parts of the vehicle is estimated, to derive e.g. handlebar vibration dampening caused from a stronger grip on the handlebar. (see FIG. 11). As methods 1 and 2 but both sensors are attached to the vehicle e.g. one next to the engine and one on the handlebars.

Method 4: The magnitude squared coherence between two limbs is calculated. (see FIG. 9)

Method 5: The magnitude squared coherence between a part of the vehicle and a limb of the rider is calculated. (see FIG. 10).

Method 6: The magnitude squared coherence between two parts of the vehicle is calculated (see FIG. 11). As methods 4 and 5, the coherence for two sensors installed on the vehicle can be calculated and used to estimate the rider's posture.

Further, the posture can be determined by the following single-sensor methods:

Method 7: A bandpass filter, which only passes frequencies close to a known excitation frequency (e.g. engine), is applied to the sensor's output. The output is compared with estimated values for certain rider postures for the current estimated excitations.

Method 8: A Spectral Analysis (Fourier Transformation) is performed for a certain time window (see FIG. 12).

Method 9: With an estimated transfer function between a part of the vehicle and a limb of the rider is estimated.

For the single-sensor methods, the vibrations at only one location on the rider's body or the vehicle are measured while the other one needs to be estimated.

Two or more of the methods 1 to 9 can be combined, wherein each method estimates another posture and/or methods estimate the same posture and the results are combined to increase the accuracy.

An advanced rider assistant systems (ARAS) that supports a rider of the motorcycle can include the system for determining the posture or the determine posture can be transmitted to the ARAS. Possible distinguishable postures can be (but are not limited to):

Rider-hands-on-handlebar-detection
Rider-foot-on-footpegs-detection
Unsafe-riding-posture-detection
Rider-prepared-to-brake-detection (not necessarily binary)
Rider-mode detection (sporty posture, relaxed cruising posture)
Estimation of rider-vehicle contact (especially inner leg-vehicle contact and grip-strength estimation)
Detected postures can be used for:
Automatic emergency braking (none, soft or hard braking intervention)
Rider skill estimation to give feedback to rider
Rider skill estimation to adjust vehicle behavior (e.g. maximum acceleration)
Riding mode determination to adjust vehicle behavior (e.g. sporty mode when sporty posture)
Rider alert when riding in unsafe riding posture (e.g. hands-off-handlebar or foot-off-footpegs).

The system and/or any of the functions described herein may be implemented using individual hardware circuitry, using software functioning in conjunction with a programmed microprocessor or a general purpose computer, using an application specific integrated circuit (ASIC) and/or using one or more digital signal processors (DSPs).

What is claimed is:

1. A system for determining a posture of an operator of a device that transmits vibrations to the operator, comprising:
at least one vibration sensor for measuring vibrations at at least one location on at least one of the operator's body and the device; and
posture determining means for detecting one or more characteristics of the measured vibrations assigned to a predetermined posture and for determining the predetermined posture as the posture of the operator when the characteristic is detected.

2. The system according to claim 1, wherein
the at least one vibration sensor is configured to measure at least one of translational movement and rotational movement and comprises at least one of an accelerometer, a piezoelectric sensor, a piezo-resistive sensor, resistive sensor, an inductive sensor, a capacitive sensor, a gyroscope, a magnetometer and a seismometer.

3. The system according to claim 1, wherein
the at least one vibration sensor is configured to measure the vibrations at at least one of the locations: palm, back of the hand, wrist, forearm, upper arm, shoulder, sole, ankle, lower leg, knee of the rider, thigh of the operator, and in case of the operator being a driver or rider of a vehicle: handlebar, handlebar grips, footrest, seat, frame, fork bridge, engine mount and engine of the vehicle.

4. The system according to claim 1, wherein
at least one of the characteristics is an intensity of the measured vibrations.

5. The system according to claim 4, wherein
the posture determining means is configured to determine an excitation frequency of the measured vibrations and to perform a filtering by a band-pass filter that passes frequencies of the measured vibrations within a certain range, wherein the center frequency of the band-pass filter is the determined excitation frequency.

6. The system according to claim 1, wherein
at least one of the characteristics is a composition of frequencies and amplitudes of a frequency spectrum of the measured vibrations and the posture determining means is configured to transform a signal of the measured vibrations in the frequency domain and to detect, in the frequency spectrum, the composition of frequencies and amplitudes assigned to the predetermined posture.

7. The system according to claim 5, wherein
the posture determining means is configured to detect one of the characteristics by measuring the vibrations at only one location.

8. The system according to claim 6, wherein
the posture determining means is configured to detect one of the characteristics by measuring the vibrations at only one location.

9. The system according to claim 1, wherein
the measuring means is configured to measure at least vibrations at a second location to which vibrations are transferred from a first location.

10. The system according to claim 9, wherein
the posture determining means is configured to determine vibrations at the first location based on at least one of: an engine speed of the vehicle, driving speed of the vehicle, gear position and throttle position.

11. The system according to according to claim 9, wherein
the at least one vibration sensor is configured to measure vibrations at the first location on the vehicle and to measure vibrations at the second location on the vehicle or the body of the operator.

12. The system according to claim 9, wherein
the at least one vibration sensor is configured to measure both vibrations at the first location and vibrations at the second location on the body of the operator.

13. The system according to claim 9, wherein
at least one of the characteristics is a transfer function of vibrations transferred from the first location to the second location; and
the posture determining means is configured to calculate the transfer function and to compare the calculated transfer function with a transfer function assigned to the predetermined posture.

14. The system according to claim 9, wherein
at least one of the characteristics is a coherence between vibrations of the first location and the second location; and
the posture determining means is configured to calculate magnitude squared coherence between vibrations of the first location and the second location and to compare the calculated magnitude squared coherence with a magnitude squared coherence assigned to the predetermined posture.

15. The system according to claim 1, wherein
the posture determining means is configured to determine each of a plurality of different postures of the operator, wherein each posture is classified by at least one of one or more predetermined characteristics and a predetermined combination of characteristics.

16. A method for determining a posture of an operator of a device that transmits vibrations to the rider, comprising:
measuring vibrations at at least one location on at least one of the body of the rider and the device;
detecting one or more characteristics of the measured vibrations assigned to a predetermined posture; and
determining the predetermined posture as the posture of the rider when the characteristic is detected.

\* \* \* \* \*